(12) United States Patent
Zhang et al.

(10) Patent No.: US 10,517,109 B2
(45) Date of Patent: *Dec. 24, 2019

(54) WIRELESS COMMUNICATION METHOD AND APPARATUS FOR TRANSFERRING BUFFERED UPLINK DATA FROM A WTRU TO A NODE-B

(71) Applicant: InterDigital Technology Corporation, Wilmington, DE (US)

(72) Inventors: Guodong Zhang, Syosset, NY (US); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/638,830

(22) Filed: Jun. 30, 2017

(65) Prior Publication Data

US 2017/0303298 A1 Oct. 19, 2017

Related U.S. Application Data

(63) Continuation of application No. 13/941,781, filed on Jul. 15, 2013, now Pat. No. 9,699,798, which is a
(Continued)

(51) Int. Cl.
*H04W 72/12* (2009.01)
*H04W 84/04* (2009.01)
(Continued)

(52) U.S. Cl.
CPC ....... *H04W 72/1252* (2013.01); *H04W 72/10* (2013.01); *H04W 72/1278* (2013.01); *H04W 28/14* (2013.01); *H04W 84/042* (2013.01)

(58) Field of Classification Search
CPC .................. H04W 72/1252; H04W 72/1278
See application file for complete search history.

(56) References Cited

U.S. PATENT DOCUMENTS 5,638,412 A 6/1997 Blakeney, II et al.
5,933,788 A 8/1999 Faerber et al.
(Continued)

FOREIGN PATENT DOCUMENTS

EP 0 887 948 12/1998
EP 1 139 605 10/2001
(Continued)

OTHER PUBLICATIONS

3GPP TS 25.308, "Technical Specification Group Radio Access Network", $3^{rd}$ Generation Partnership Project; High Speed Downlink Packet Access (HSDPA); Overall description; Stage 2, (Release 5), Version 5.4.0 (Mar. 2003).
(Continued)

*Primary Examiner* — Yemane Mesfin
*Assistant Examiner* — Henry Baron
(74) *Attorney, Agent, or Firm* — Volpe and Koenig, P.C.

(57) ABSTRACT

A wireless transmit/receive unit (WTRU) comprises an antenna, a transmitter, and a receiver. The transmitter is configured to transmit an indication of uplink data on an uplink control channel on a condition that uplink data is in a buffer of the WTRU. The WTRU is configured to use the uplink control channel and an uplink data channel. The receiver is configured to receive an uplink scheduling message based on the transmitted indication of uplink data. The transmitter is further configured to transmit uplink data on the uplink data channel based on the received uplink scheduling message. The transmitted uplink data is included in a medium access control (MAC) protocol data unit (PDU). The MAC PDU includes traffic volume information. A header of the MAC PDU includes a field indicating the presence of the traffic volume information.

12 Claims, 3 Drawing Sheets

Related U.S. Application Data continuation of application No. 10/945,361, filed on Sep. 20, 2004, now Pat. No. 8,488,457.

(60) Provisional application No. 60/520,227, filed on Nov. 14, 2003.

(51) Int. Cl.
*H04W 72/10* (2009.01)
*H04W 28/14* (2009.01)

(56) References Cited

U.S. PATENT DOCUMENTS

| | | | |
|---|---|---|---|
| 6,108,316 | A | 8/2000 | Agrawal et al. |
| 6,111,869 | A | 8/2000 | Esmailzadeh et al. |
| 6,141,336 | A | 10/2000 | Bauchot et al. |
| 6,181,948 | B1 | 1/2001 | Kondo |
| 6,459,687 | B1 | 10/2002 | Bourlas et al. |
| 6,567,416 | B1 | 5/2003 | Chuah |
| 6,640,105 | B1 | 10/2003 | Shin |
| 6,768,715 | B2 | 7/2004 | Hsu et al. |
| 6,940,831 | B1 | 9/2005 | Omi et al. |
| 6,993,342 | B2 | 1/2006 | Kuchibhotla et al. |
| 7,124,350 | B2 | 10/2006 | Chao et al. |
| 7,158,504 | B2 | 1/2007 | Kadaba et al. |
| 7,215,653 | B2 | 5/2007 | Kim et al. |
| 7,369,501 | B2 | 5/2008 | Kim et al. |
| 7,376,412 | B2 | 5/2008 | Kuramatsu |
| 7,609,635 | B2 | 10/2009 | Bae et al. |
| 8,040,834 | B2 | 10/2011 | Zhang et al. |
| 8,488,457 | B2 | 7/2013 | Zhang et al. |
| 9,723,596 | B2 | 8/2017 | Zhang et al. |
| 9,826,510 | B2 | 11/2017 | Zhang et al. |
| 2001/0021229 | A1 | 9/2001 | Belaiche |
| 2001/0036823 | A1 | 11/2001 | Van Lieshout et al. |
| 2002/0089952 | A1 | 7/2002 | Cao et al. |
| 2002/0093953 | A1 | 7/2002 | Naim et al. |
| 2002/0136286 | A1 | 9/2002 | Koo |
| 2002/0183064 | A1 | 12/2002 | Gopalakrishnan et al. |
| 2002/0183066 | A1 | 12/2002 | Pankaj |
| 2003/0073437 | A1 | 4/2003 | Yuen |
| 2003/0125037 | A1 | 7/2003 | Bae et al. |
| 2003/0133457 | A1 | 7/2003 | Ono et al. |
| 2003/0147371 | A1* | 8/2003 | Choi .............. H04B 7/2637 370/341 |
| 2003/0174730 | A1 | 9/2003 | Hsueh et al. |
| 2003/0198207 | A1 | 10/2003 | Lee et al. |
| 2003/0219037 | A1 | 11/2003 | Toskala et al. |
| 2003/0232624 | A1 | 12/2003 | Toskala et al. |
| 2004/0062206 | A1 | 4/2004 | Soong et al. |
| 2004/0100919 | A1 | 5/2004 | Jang |
| 2004/0151143 | A1 | 8/2004 | Abdesselem et al. |
| 2004/0160919 | A1 | 8/2004 | Balachandran et al. |
| 2004/0203973 | A1 | 10/2004 | Khan |
| 2004/0219919 | A1* | 11/2004 | Whinnett .......... H04W 72/1278 455/442 |
| 2004/0223455 | A1 | 11/2004 | Fong et al. |
| 2004/0228313 | A1 | 11/2004 | Cheng et al. |
| 2004/0229604 | A1 | 11/2004 | Fong et al. |
| 2005/0025100 | A1 | 2/2005 | Lee et al. |
| 2005/0030953 | A1 | 2/2005 | Vasudevan et al. |
| 2005/0053088 | A1 | 3/2005 | Cheng et al. |
| 2005/0207359 | A1 | 9/2005 | Hwang et al. |
| 2005/0213677 | A1 | 9/2005 | Cho et al. |
| 2006/0023629 | A1 | 2/2006 | Kim et al. |
| 2007/0008990 | A1* | 1/2007 | Torsner ............. H04L 1/18 370/473 |
| 2007/0064646 | A1 | 3/2007 | Esteves et al. |

FOREIGN PATENT DOCUMENTS

| | | |
|---|---|---|
| EP | 1 231 807 | 8/2002 |
| EP | 1 257 140 | 11/2002 |
| EP | 1257096 A2 | 11/2002 |
| EP | 1 511 245 | 3/2005 |
| JP | 2000-341292 | 12/2000 |
| JP | 2002-247048 | 8/2002 |
| KR | 20020004645 | 1/2002 |
| WO | 04/034656 | 4/2004 |
| WO | 06/043782 | 4/2006 |

OTHER PUBLICATIONS

3GPP TS 25.308, "Technical Specification Group Radio Access Network", $3^{rd}$ Generation Partnership Project; High Speed Downlink Packet Access (HSDPA); Overall description; Stage 2, (Release 6), Version 6.1.0 (Mar. 2004).

3GPP TS 25.308, "Technical Specification Group Radio Access Network", $3^{rd}$ Generation Partnership Project; High Speed Downlink Packet Access (HSDPA); Overall description; Stage 2, (Release 6), Version 6.2.0 (Sep. 2004).

3GPP TS 25.309, "Technical Specification Group Radio Access Network"; 3rd Generation Partnership Project; FDD Enhanced Uplink; Overall description; Stage 2 (Release 6) Version 1.0.0 (Sep. 2004).

3GPP TS 25.309, "Technical Specification Group Radio Access Network"; 3rd Generation Partnership Project; FDD Enhanced Uplink; Overall description; Stage 2 (Release 6) Version 6.0.0 (Sep. 2004).

3GPP TS 25.321, "Technical Specification Group Radio Access Network", $3^{rd}$ Generation Partnership Project; Medium Access Control (MAC) protocol specification (Release 5), Version 5.6.0 (Sep. 2003).

3GPP TS 25.321, "Technical Specification Group Radio Access Network", $3^{rd}$ Generation Partnership Project; Medium Access Control (MAC) protocol specification (Release 6), Version 6.1.0 (Mar. 2004).

3GPP TS 25.321, "Technical Specification Group Radio Access Network", $3^{rd}$ Generation Partnership Project; Medium Access Control (MAC) protocol specification (Release 6), Version 6.2.0 (Jun. 2004).

3GPP, "$3^{rd}$ Generation Partnership Project; Technical Specification Group Radio Access Network; High Speed Downlink Packet Access (HSDPA); Overall description; Stage 2, (Release 5)," 3GPP TS 25.308 V5.5.0 (Mar. 2004).

3GPP, "$3^{rd}$ Generation Partnership Project; Technical Specification Group Radio Access Network; High Speed Downlink Packet Access (HSDPA); Overall description; Stage 2, (Release 5)," 3GPP TS 25.308 V5.6.0 (Mar. 2004).

3GPP, "$3^{rd}$ Generation Partnership Project; Technical Specification Group Radio Access Network; Feasibility Study for Enhanced Uplink for UTRA FDD; (Release 6)," 3GPP TR 25.896 V2.0.0 (Mar. 2004).

3GPP, "$3^{rd}$ Generation Partnership Project; Technical Specification Group Radio Access Network; Feasibility Study for Enhanced Uplink for UTRA FDD; (Release 6)," 3GPP TR 25.896 V6.0.0 (Apr. 2004).

3GPP, "$3^{rd}$ Generation Partnership Project; Technical Specification Group Radio Access Network, Medium Access Control (MAC) protocol specification (Release 1999)," 3GPP TS 25.321V3.16.0 (Sep. 2003).

3GPP, "$3^{rd}$ Generation Partnership Project; Technical Specification Group Radio Access Network, Medium Access Control (MAC) protocol specification (Release 1999)," 3GPP TS 25.321V3.17.0 (Jun. 2004).

3GPP, "$3^{rd}$ Generation Partnership Project; Technical Specification Group Radio Access Network, Medium Access Control (MAC) protocol specification (Release 4)," 3GPP TS 25.321V4.9.0 (Sep. 2003).

3GPP, "$3^{rd}$ Generation Partnership Project; Technical Specification Group Radio Access Network, Medium Access Control (MAC) protocol specification (Release 4)," 3GPP TS 25.321V4.10.0 (Jun. 2004).

3GPP, "$3^{rd}$ Generation Partnership Project; Technical Specification Group Radio Access Network, Medium Access Control (MAC) protocol specification (Release 5)," 3GPP TS 25.321V5.8.0 (Mar. 2004).

(56) References Cited

OTHER PUBLICATIONS

3GPP, "3rd Generation Partnership Project; Technical Specification Group Radio Access Network, Medium Access Control (MAC) protocol specification (Release 5)," 3GPP TS 25.321V5.9.0 (Jun. 2004).

3GPP, "3rd Generation Partnership Project; Specification Group Radio Access Network; Radio Resource Control (RRC); Protocol Specification (Release 5)," 3GPP TS 25.331 V5.9.0 (Jun. 2004).

3GPP, "3rd Generation Partnership Project; Technical Specification Group Radio Access Network; Physical channels and mapping of transport channels onto physical channels (FDD) (Release 6)," 3GPP TS 25.211 V6.1.0 (Jun. 2004).

3GPP, "3rd Generation Partnership Project; Technical Specification Group Radio Access Network; Physical channels and mapping of transport channels onto physical channels (FDD) (Release 5)," 3GPP TS 25.211 V5.5.0 (Sep. 2003).

3GPP, "3rd Generation Partnership Project; Technical Specification Group Radio Access Network; Physical channels and mapping of transport channels onto physical channels (FDD) (Release 6)," 3GPP TS 25.211 V6.0.0 (Dec. 2003).

3GPP, "3rd Generation Partnership Project; Technical Specification Group Radio Access Network; Physical channels and mapping of transport channels onto physical channels (FDD) (Release 6)," 3GPP TS 25.211 V5.6.0 (Sep. 2004).

3GPP, "3rd Generation Partnership Project; Technical Specification Group Radio Access Network; Physical channels and mapping of transport channels onto physical channels (FDD) (Release 6)," 3GPP TS 25.211 V6.2.0 (Sep. 2004).

3GPP, "3rd Generation Partnership Project; Technical Specification Group Radio Access Network; Spreading and modulation (FDD) (Release 1999)," 3GPP TS 25.213 V3.9.0 (Dec. 2003).

3GPP, "3rd Generation Partnership Project; Technical Specification Group Radio Access Network; Spreading and modulation (FDD) (Release 4)," 3G TS 25.213 V4.4.0 (Dec. 2003).

3GPP, "3rd Generation Partnership Project; Technical Specification Group Radio Access Network; Spreading and modulation (FDD) (Release 5)," 3GPP TS 25.213 V5.5.0 (Dec. 2003).

3GPP, "3rd Generation Partnership Project; Technical Specification Group Radio Access Network; Spreading and modulation (FDD) (Release 6)," 3GPP TS 25.213 V6.0.0 (Dec. 2003).

3GPP, "3rd Generation Partnership Project; Technical Specification Group Radio Access Network; Spreading and modulation (FDD) (Release 1999)," 3GPP TS 25.213 V3.8.0 (Jun. 2002).

3GPP, "3rd Generation Partnership Project; Technical Specification Group Radio Access Network; Spreading and modulation (FDD) (Release 4)," 3G TS 25.213 V4.3.0 (Jun. 2002).

3GPP, "3rd Generation Partnership Project; Technical Specification Group Radio Access Network; Spreading and modulation (FDD) (Release 5)," 3GPP TS 25.213 V5.4.0 (Sep. 2003).

3GPP, 3rd Generation Partnership Project; Technical Specification Group Radio Access Network; Radio Resource Control (RRC) protocol specification (Release 1999), 3GPP TS 25.331 V3.16.0 (Sep. 2003).

3GPP, "3rd Generation Partnership Project; Technical Specification Group Radio Access Network; Radio Resource Control (RRC) protocol specification (Release 1999)," 3GPP TS 25.331 V3.19.0 (Jun. 2004).

3GPP, 3rd Generation Partnership Project; Technical Specification Group Radio Access Network; Radio Resource Control (RRC); Protocol Specification (Release 4), 3GPP TS 25.331 V4.11.0 (Sep. 2003).

3GPP, "3rd Generation Partnership Project; Technical Specification Group Radio Access Network; Radio Resource Control (RRC); Protocol Specification (Release 4)," 3GPP TS 25.331 V4.14.0 (Jun. 2004).

3GPP, 3rd Generation Partnership Project; Technical Specification Group Radio Access Network; Radio Resource Control (RRC); Protocol Specification (Release 5), 3GPP TS 25.331 V5.6.0 (Sep. 2003).

3GPP, "3rd Generation Partnership Project; Technical Specification Group Radio Access Network; Radio Resource Control (RRC); Protocol Specification (Release 6)," 3GPP TS 25.331 V6.2.0 (Jun. 2004).

3GPP, "3rd Generation Partnership Project; Technical Specification Group Radio Access Network; Radio Resource Control (RRC) protocol specification (Release 1999)," 3GPP TS 25.331 V3.17.0 (Dec. 2003).

3GPP2 C.S0002-C, "Physical Layer Standard for cdma2000 Spread Spectrum Systems", 3rd Generation Partnership Project 2"3GPP2", Version 2.0, Revision C, Jul. 23, 2004.

3GPP2 C.S0003-C, "Medium Access Control (MAC) Standard for cdma2000 Spread Spectrum Systems", 3rd Generation Partnership Project 2"3GPP2", Version 2.0, Release C, Aug. 2004.

3GPP2 C.S0004-C, "Signaling Link Access Control (LAC) Standard for cdma2000 Spread Spectrum Systems", 3rd Generation Partnership Project 2"3GPP2", Version 2.0, Revision C, Jul. 23, 2004.

3GPP2 C.S0005-C, "Upper Layer (Layer 3) Signaling Standard for cdma2000 Spread Spectrum Systems", 3rd Generation Partnership Project 2"3GPP2", Version 2.0, Revision C, Jul. 23, 2004.

Fujitsu, "Revised text proposal for Credit based enhanced uplink scheduling," 3GPP TSG-RAN WG1 #34, R1-031117 (Oct. 2003).

Lucent, "Scheduled and Autonomous Mode Operation for the Enhanced Uplink," 3GPP TSG RAN WG1#31, R1-03-0284 (Feb. 17-20, 2003).

Motorola, "Management of Enhanced Uplink Scheduling Modes," 3GPPRAN1#32, # R1-03-0622 (477) (May 19-23, 2003).

Nokia Corporation et al., "Draft 25.331 CR for TVM for Enhanced Uplink with comments," 3GPP TSG-RAN WG2 Meeting #62bis, R2-083347, Warsaw, Poland (Jun. 30-Jul. 4, 2008).

Nokia, "Issues to be studied for Enhanced Uplink DCH," 3GPP TSG-RAN WG1 #28bis meeting, R1-02-1219, Espoo, Finland (Oct. 8-9, 2002).

Nokia, "Signalling Enhancement for UEs in PCH/FACH," 3GPP TSG RAN WG2 Meeting #39, R2-032396, San Diego, California (Nov. 17-21, 2003).

Qualcomm Europe, "Reference Node-B scheduler for EUL," TSG-RAN WG1 Meeting #35, R1-031246 (Nov. 2003).

Samsung, "TP on uplink signalling of scheduling information update," TSG-RAN WG1 Meeting #35, R1-031439 (Nov. 2003).

Samsung, "Transmission of small size packet," 3 GPP TSG-RAN WG1 #34, R1-030991 (Oct. 2003).

Samsung, "Uplink signalling of scheduling information," 3GPP TSG-RAN WG1 #34, R1-031056 (Oct. 2003).

Lucent Technologies, "Signalling for H-ARQ Operation," 3GPP TSG-WG1#31, R1-03-0285 (Feb. 18-21, 2003).

Third Generation Partnership Project, "Technical Specification Group Radio Access Network; Feasibility Study for Enhanced Uplink for UTRA FDD; (Release 6)," 3GPP TR 25.896 V1.3.2, R1-040391 (Feb. 2004).

Nokia, "Uplink Signalling for Node B Scheduling," 3GPP TSG-RAN WG1 Ad hoc meeting, R1-04-0076, Espoo, Finland (Jan. 27-30, 2004).

3GPP, "3rd Generation Partnership Project; Technical Specification Group Radio Access Network; Feasibility Study for Enhanced Uplink for UTRA FDD; (Release 6)," 3GPP TR 25.896 V1.2.1 (Jan. 2004).

3GPP, "3rd Generation Partnership Project; Technical Specification Group Radio Access Network; Physical channels and mapping of transport channels onto physical channels (TDD) (Release 1999)," 3GPP TS 25.221 V3.11.0 (Sep. 2002).

3GPP, "3rd Generation Partnership Project; Technical Specification Group Radio Access Network; Physical channels and mapping of transport channels onto physical channels (TDD) (Release 4)," 3GPP TS 25.221 V4.7.0 (Dec. 2002).

3GPP, "3rd Generation Partnership Project; Technical Specification Group Radio Access Network; Physical channels and mapping of transport channels onto physical channels (TDD) (Release 5)," 3GPP TS 25.221 V5.5.0 (Jun. 2003).

3GPP, "3rd Generation Partnership Project; Technical Specification Group Radio Access Network; Physical channels and mapping of transport channels onto physical channels (TDD) (Release 6)," 3GPP TS 25.221 V6.1.0 (Jun. 2004).

(56) References Cited

OTHER PUBLICATIONS

Samsung, "EUL scheduling: signalling support," 3GPP TSG-RAN WG1 Meeting #38, R1-040865, Prague, Czech Republic (Aug. 16-20, 2004).
Samsung, "Node B controlled scheduling," 3GPP TSG-RAN WG1 Meeting #38, R1-040851, Prague, Czech Republic (Aug. 16-20, 2004).
Samsung, "EUL scheduling and related signaling information," 3GPP TSG-RAN WG1 Rel-6 Ad Hoc, R1-040690, Cannes, France (Jun. 21-24, 2004).
LG Electronics, "Further issues on L2/L3 protocols in E-DCH," TSG-RAN Working Group 2 #41, R2-040418, Malaga, Spain (Feb. 16-20, 2004).
3GPP TR 25.896 V1.1.0, "$3^{rd}$ Generation Partnership Project; Technical Specification Group Radio Access Network; Feasibility Study for Enhanced Uplink for UTRA FDD; (Release 6)", Nov. 2003.
3GPP TS 25.211 V3.12.0 , "3rd Generation Partnership Project; Technical Specification Group Radio Access Network; Physical channels and mapping of transport channels onto physical channels (FDD) (Release 1999)", (Sep. 2002).
3GPP TS 25.211 V4.6.0 , "3rd Generation Partnership Project; Technical Specification Group Radio Access Network; Physical channels and mapping of transport channels onto physical channels (FDD) (Release 4)", (Sep. 2002).
3GPP TR 25.896 V1.1.1 , "$3^{rd}$ Generation Partnership Project; Technical Specification Group Radio Access Network; Feasibility Study for Enhanced Uplink for UTRA FDD; (Release 6)", Nov. 2003.
3GPP TR 25.896 V1.0.2, "$3^{rd}$ Generation Partnership Project; Technical Specification Group Radio Access Network; Feasibility Study for Enhanced Uplink for UTRA FDD; (Release 6)", Oct. 2003.

* cited by examiner

WIRELESS COMMUNICATION METHOD AND APPARATUS FOR TRANSFERRING BUFFERED UPLINK DATA FROM A WTRU TO A NODE-B

CROSS REFERENCE TO RELATED APPLICATION

This application is a continuation of U.S. patent application Ser. No. 13/941,781, filed Jul. 15, 2013, which is a continuation of U.S. patent application Ser. No. 10/945,361, filed Sep. 20, 2004, which issued as U.S. Pat. No. 8,488,457 on Jul. 16, 2013, which claims priority from U.S. Provisional Patent Application No. 60/520,227, filed Nov. 14, 2003, which are incorporated by reference as if fully set forth herein.

FIELD OF INVENTION

The present invention is related to a wireless communication system including a wireless transmit/receive unit (WTRU) and a Node-B. More particularly, the present invention is related to providing WTRU uplink (UL) traffic information to the Node-B for scheduling enhanced uplink (EU) transmissions.

BACKGROUND

Methods for enhancing UL coverage, throughput and transmission latency in a wireless communication system, such as a frequency division duplex (FDD) system, are currently being investigated in release 6 (R6) of the third generation partnership project (3GPP). Instead of scheduling and assigning UL physical channels in a radio network controller (RNC), a Node-B (i.e., a base station controller) is used to communicate with a plurality of WTRUs such that more efficient decisions can be made and UL radio resources can be managed on a short-term basis better than the RNC, even if the RNC retains overall control of the system. A similar approach has already been adopted in the downlink for release 5 (R5) of high speed downlink packet access (HSDPA) in a universal mobile telecommunications system (UMTS) for both an FDD mode and a time division duplex (TDD) mode.

In order for the Node-B to make efficient allocation decisions and prioritize between different data flows, the Node-B requires knowledge of UL data buffered in the WTRU for individual data channels along with their associated priority. However, conventional UL signaling methods have limited capacity, and thus may not be able to accommodate the reporting of detailed traffic volume measurement (TVM) information from the WTRU.

SUMMARY

The present invention is a wireless communication method and apparatus for transferring buffered EU data from a WTRU, (i.e., a mobile station), to a Node-B. The apparatus may be a wireless communication system, a WTRU and/or an integrated circuit (IC). The EU data is generated and stored in a buffer of the WTRU. The WTRU transmits an initial EU data transmission request message to the Node-B indicating that the WTRU has EU data to transfer to the Node-B. The initial EU data transmission request message includes a request for a desired transport format combination (TFC) or data traffic indicator. In response to receiving the initial EU data transmission request message, the Node-B schedules one or more allowed EU data transmissions between the WTRU and the Node-B by transmitting an EU data scheduling message to the WTRU. The WTRU transfers all of the EU data stored in the buffer to the Node-B if the allowed EU data transmissions are sufficient to support transmission of all of the EU data stored in the buffer. Otherwise, the WTRU transmits a portion of the EU data along with the desired TFC or detailed TVM information to the Node-B.

The procedure used to transfer EU data stored in the buffer of the WTRU may be dependent upon whether or not the quantity of the EU data exceeds an established threshold. The initial EU data transmission request message may be transmitted to the Node-B only after the quantity of the stored EU data exceeds the established threshold. When the established threshold is not exceeded, the WTRU may transfer all of the EU data from the buffer of the WTRU to the Node-B without requiring scheduling information from the Node-B. If the established threshold is set to zero, the WTRU may transfer the stored EU data from the buffer of the WTRU to the Node-B only after receiving scheduling information from the Node-B.

The EU data transmission request message may be identified in at least one layer 1 physical control field or layer 2 medium access control (MAC) header.

The desired TFC or data traffic indicator may be signaled in at least one physical control field on an EU dedicated physical control channel (EU-DPCCH). Another field on the EU-DPCCH may include other EU related messages. If there is no EU data for the WTRU to transfer to the Node-B that requires further scheduling, the physical control field is empty or not included.

In an alternate embodiment, the EU data transmission message may include a MAC header with a field including the desired TFC or detailed TVM information. The MAC header may further include one or more other EU MAC fields. When the MAC header is empty or not included, there is no EU data for the WTRU to transfer to the Node-B.

BRIEF DESCRIPTION OF THE DRAWING(S)

A more detailed understanding of the invention may be had from the following description of a preferred example, given by way of example and to be understood in conjunction with the accompanying drawing wherein.

DETAILED DESCRIPTION OF THE PREFERRED EMBODIMENT(S)

Hereafter, the terminology "WTRU" includes but is not limited to a user equipment (UE), mobile station, fixed or mobile subscriber unit, pager, or any other type of device capable of operating in a wireless environment.

When referred to hereafter, the terminology "Node-B" includes but is not limited to a base station, site controller, access point or any other type of interfacing device in a wireless environment.

The present invention may be further applicable to TDD, FDD, and time division synchronous code division multiple access (TD-SCDMA), as applied to Universal Mobile Telecommunications System (UMTS), CDMA 2000 and CDMA in general, but is envisaged to be applicable to other wireless systems as well.

The features of the present invention may be incorporated into an IC or be configured in a circuit comprising a multitude of interconnecting components.

Figure 1:
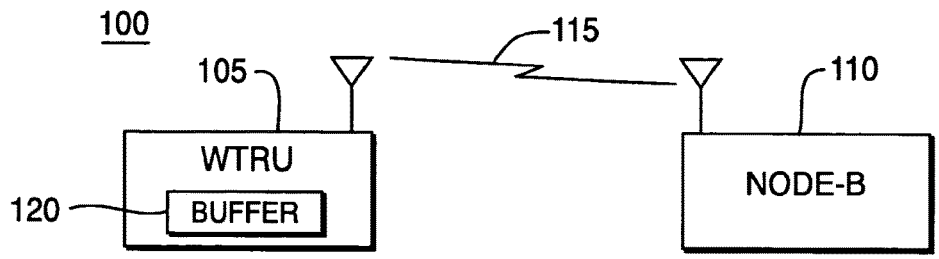
FIG. 1 shows a wireless communication system operating in accordance with the present invention.

FIG. 1 shows a wireless communication system 100 operating in accordance with the present invention. The system 100 includes a WTRU 105 and a Node-B 110 which communicate with each other via wireless signals 115. The WTRU 105 includes at least one buffer 120.

Figure 2:
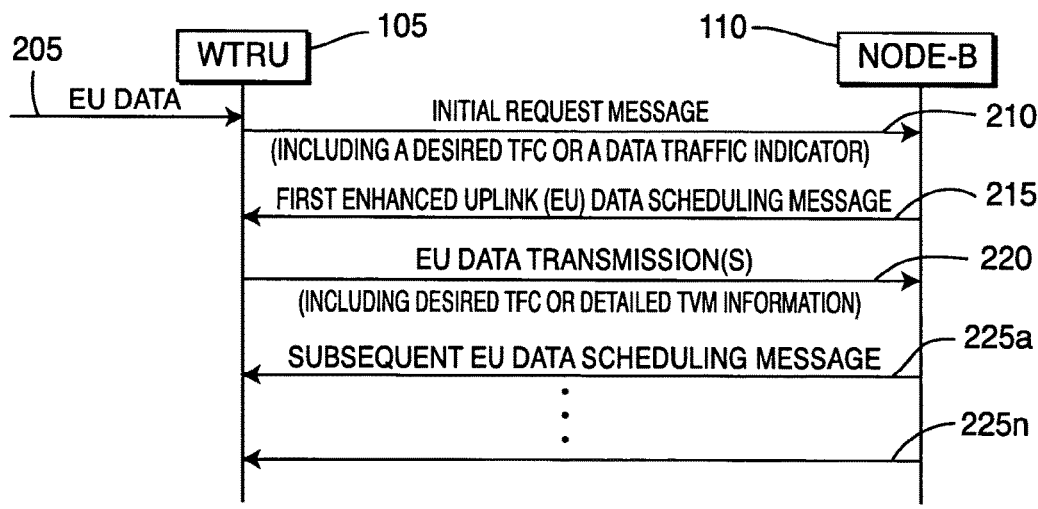
FIG. 2 is a signal flow diagram for the system of FIG. 1 when the EU data transmissions allowed by an EU data scheduling message are not sufficient to transmit all of the EU data buffered in the WTRU.

FIG. 2 is a signal flow diagram for the wireless communication system 100 when one or more EU data transmissions allowed by a first EU data scheduling message are not sufficient to transmit all of the EU data stored in the buffer 120 of the WTRU 105. EU data 205 is generated at the WTRU 105 and is stored in the buffer 120 of the WTRU 105. When the quantity of the EU data in the buffer 120 exceeds an established EU data buffer threshold, the WTRU 105 sends an initial request message 210 to the Node-B 110 via an EU signaling channel. EU data transmissions sent by the WTRU 105 are not required to be scheduled by the Node-B 110 when the established threshold is not exceeded.

The initial request message 210 may include a desired TFC or a data traffic indicator. If the limited payload capacity of the EU control channel cannot accommodate the signaling of a desired TFC, the WTRU 105 may send a message to the Node-B 110 indicating that the WTRU 105 has EU data to transmit to the Node-B 110 via an EU control channel. The desired TFC may be an index to a preconfigured list of possible uplink transport formats (or TFCs).

Referring still to FIG. 2, upon receiving the initial request message 210, the Node-B 110 schedules one or more EU data transmissions between the WTRU 105 and the Node-B 110 via a first EU data scheduling message 215. In response to receiving the first EU data scheduling message 215, the WTRU 105 sends one or more EU data transmissions 220 to the Node-B 110 allowed by the first EU data scheduling message 215. If the EU data transmissions allowed by the first EU data scheduling message 215 are not sufficient to transmit all of the EU data buffered in the WTRU 105, the WTRU 105 sends EU data transmissions 220 including desired TFC information to the Node-B 110. The desired TFC information included in messages 210 and 220 may either be signaled in at least one physical control field or MAC header along with the EU data transmissions 220. The desired TFC may be reflected by an index into a list of predetermined TFCs. The desired TFC is used by the Node-B 110 to determine and generate subsequent scheduling messages 225a-225n.

Alternatively, in lieu of the desired TFC information, detailed TVM information may be provided with the EU data transmissions 220. The detailed TVM information may indicate the amount of buffered data associated with individual traffic flows (channels) that can be associated with priority classes mapped to the EU dedicated channel (EU-DCH). Node-B 110 can utilize the comprehensive knowledge of the desired TFC or detailed TVM information and potentially associated priorities reported via the EU transmissions 220 to determine subsequent uplink scheduling. When the WTRU 105 obtains additional EU data later on, the WTRU 105 may choose to report updated desired TFC or detailed TVM information to the Node-B 110. The Node-B 110 then schedules subsequent EU data transmissions from the WTRU 105 to the Node-B 110 via subsequent EU data scheduling messages 225a-225n.

Figure 3:
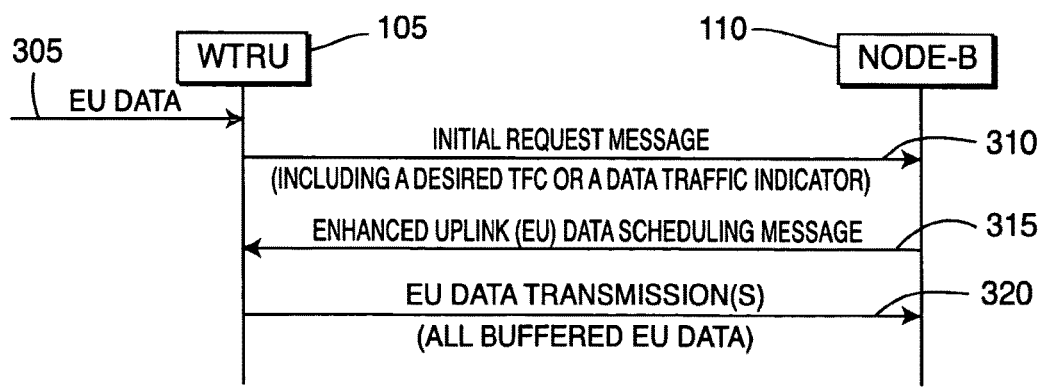
FIG. 3 is a signal flow diagram for the system of FIG. 1 when the EU data transmissions allowed by an EU data scheduling message are sufficient to transmit all of the EU data buffered in the WTRU.

FIG. 3 is a signal flow diagram for the wireless communication system 100 when one or more EU data transmissions allowed by an EU data scheduling message are sufficient to transmit all of the EU data stored in the buffer 120 of the WTRU 105. EU data 305 is generated at the WTRU 105 and is stored in the buffer 120 of the WTRU 105. When the quantity of the EU data in the buffer 120 exceeds an established EU data buffer threshold, the WTRU 105 sends an initial request message 310 to the Node-B 110 via an EU signaling channel. The initial request message 310 may include a desired TFC or a data traffic indicator. If the limited payload capacity of the EU control channel cannot accommodate the signaling of a desired TFC, the WTRU 105 may send a message to the Node-B 110 indicating that the WTRU 105 has EU data to transmit to the Node-B 110 via an EU control channel. The desired TFC may be an index to a preconfigured list of possible uplink transmission formats (or TFCs).

EU data transmissions sent by the WTRU 105 are not required to be scheduled by the Node-B 110 when the established EU data buffer threshold is not exceeded.

Still referring to FIG. 3, upon receiving the initial request message 310, the Node-B 110 schedules one or more EU data transmissions between the WTRU 105 and the Node-B 110 via an EU data scheduling message 315. In response to receiving the EU data scheduling message 315, the WTRU 105 sends one or more EU data transmissions 320 allowed by the EU data scheduling message 315. If the EU data transmissions allowed by the EU data scheduling message 315 are sufficient to transmit all of the EU data 305 buffered in the WTRU 105, all of the EU data stored in the buffer 120 of the WTRU 105 is sent to the Node-B 110. In this case, UL signaling information indicating the desired TFC or detailed TVM information is either not included or an associated message field is left empty, indicating that the WTRU 105 does not require further scheduling allocations.

Figure 4:
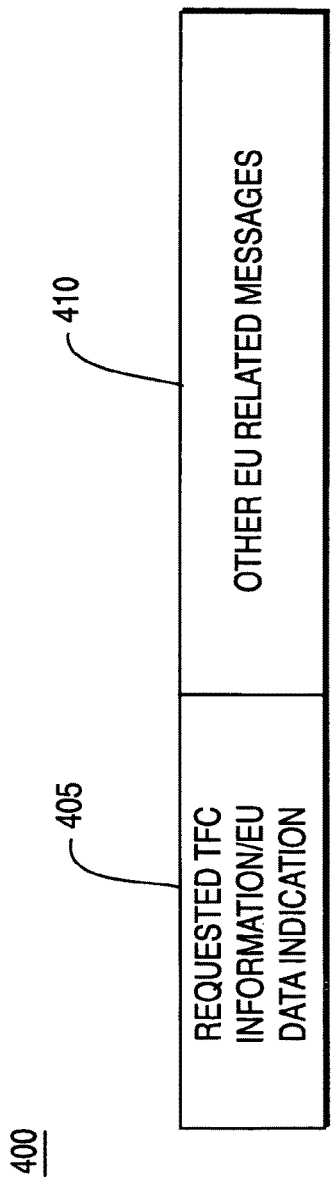
FIG. 4 shows a frame structure used for requesting EU data scheduling information via an EU channel in accordance with one embodiment of the present invention.

FIG. 4 shows a frame structure 400 used for requesting EU data scheduling information via an EU channel in accordance with one embodiment of the present invention. The frame structure 400 may be incorporated into the initial request message 210 and, potentially, the EU data transmissions 220 previously described in conjunction with FIG. 2.

The frame structure 400 includes a "requested TFC information/EU data indication" field 405 and an "other EU related messages" field 410. The requested TFC information/EU data indication field 405 is signaled in at least one physical control field on the EU-DPCCH. An empty requested TFC information/EU data indication field 405 indicates that there is no more buffered EU data for the WTRU 105 to send to the Node-B 110, and thus, no further scheduling allocations from the Node-B 110 are required. The EU-DPCCH may be code or time-multiplexed with an EU-DCH and/or a high speed dedicated physical control channel (HS-DPCCH).

Figure 5:
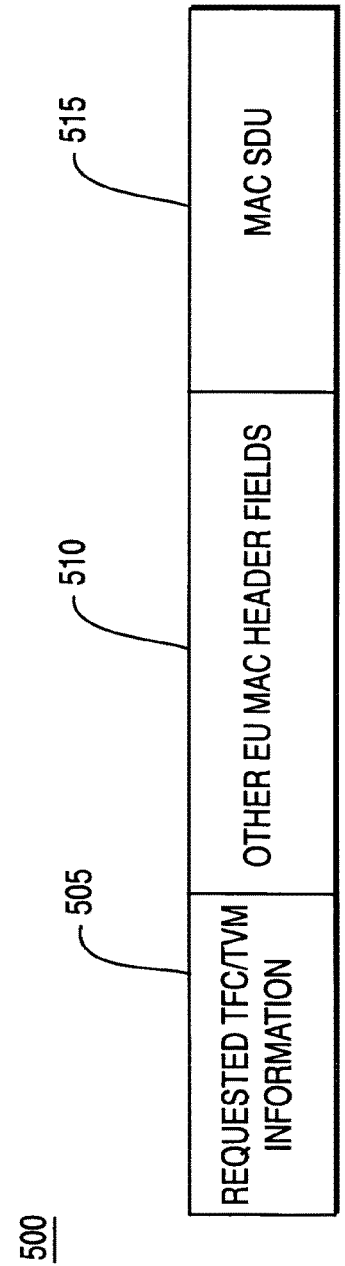
FIG. 5 show a MAC PDU format used to indicate a desired TFC or detailed TVM information in accordance with an alternate embodiment of the present invention.

FIG. 5 shows a MAC protocol data unit (PDU) format 500 used to indicate a desired TFC or detailed TVM information in accordance with an alternate embodiment of the present invention. The MAC PDU format 500 may be incorporated into the EU data transmissions 220 and, potentially, the initial request message 210 previously described in conjunction with FIG. 2.

The MAC PDU format 500 includes a "requested TFC/TVM information field" 505, one or more "other EU MAC header fields" 510, and a MAC SDU field 515. The requested TFC/TVM information field 505 is signaled within the MAC header of EU data transmissions. An empty requested TFC/TVM information field 505 indicates that there is no more buffered EU data for the WTRU 105 to send to the Node-B 110, and thus, no further scheduling allocations from the Node-B 110 are required.

Figure 6:
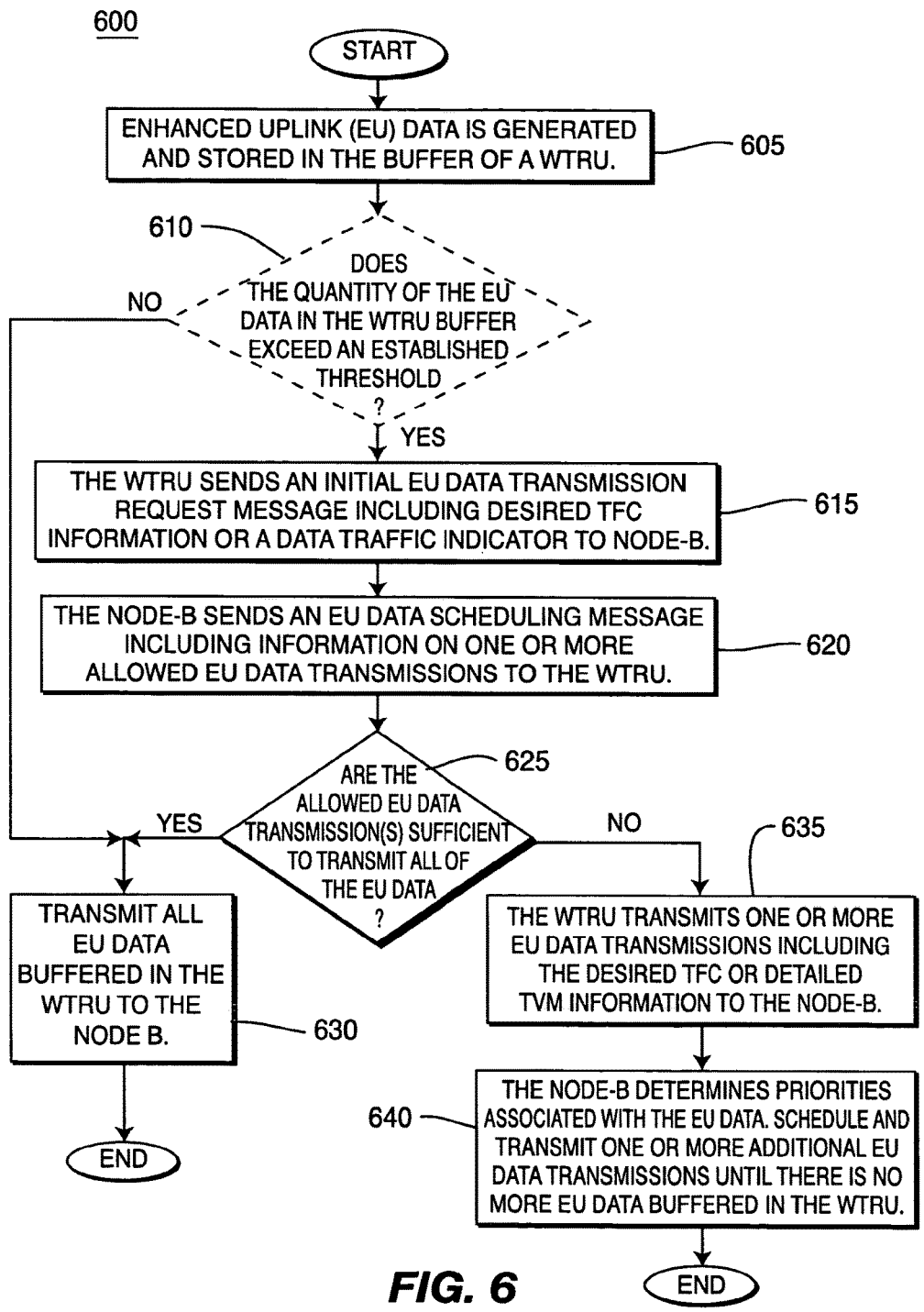
FIG. 6 is a flowchart of a process including method steps for transferring buffered EU data in accordance with the present invention.

FIG. 6 is a flowchart of a process 600 including method steps for transferring user data from the WTRU 105 to the Node-B 110 in accordance with the present invention. In step 605, EU data is generated and stored in the buffer 120 of the WTRU 105. In optional step 610, a determination is made as to whether or not the quantity of EU data stored in the buffer 120 of the WTRU 105 exceeds an established threshold. When the quantity of the stored EU data in the buffer 120 of the WTRU 105 does not exceed the established threshold, EU transmissions are allowed without Node-B scheduling, and all of the stored EU data is transmitted to the Node-B 110 (step 630). If the quantity of the stored EU data exceeds the established threshold, the WTRU 105 sends an initial EU data transmission request message including desired TFC information or just a traffic indicator (i.e., an EU data indication) to the Node-B 110 indicating that the WTRU 105 has EU data to send to the Node-B 110 (step 615).

It should be noted that the established EU data buffer threshold may be set to zero. In this case, the storage of any amount of EU data in the buffer 120 of the WTRU 105 will always trigger the transmission of an initial request message 210.

Still referring to FIG. 6, in step 620, the Node-B 110 sends an EU data scheduling message, including information on one or more allowed EU data transmissions, to the WTRU 105 to schedule transmission of the EU data buffered in the WTRU 105 to the Node-B 110. In step 625, the WTRU 105 determines if the allowed EU data transmissions are sufficient to transmit all of the buffered EU data. If the EU data transmissions allowed by the current scheduling information are sufficient to support transmission of all of the EU data stored in the buffer 120, all of the EU data buffered in the WTRU 105 is transmitted to the Node-B 110 in the allowed EU data transmissions (step 630).

If the EU data transmissions allowed by the current scheduling information are not sufficient to transmit all of the EU data buffered in the WTRU 105, the WTRU 105 transmits one or more EU data transmissions including the desired TFC or detailed TVM information to the Node-B 110 (step 635). In step 640, the Node-B 110 determines priorities associated with the EU data. Node-B 110 utilizes the knowledge of the requested TFC or detailed TVM information, and associated priorities for determining the EU physical channel, and scheduling and transmitting one or more additional EU data transmissions until there is no more EU data buffered in the WTRU 105.

While this invention has been particularly shown and described with reference to preferred embodiments, it will be understood by those skilled in the art that various changes in form and details may be made therein without departing from the scope of the invention described hereinabove.

What is claimed is:

1. A wireless transmit/receive unit (WTRU) comprising:
an antenna;
a receiver; and
a transmitter; wherein:
the transmitter is configured to transmit an indication of uplink data on an uplink control channel on a condition that uplink data is in a buffer of the WTRU; wherein the WTRU is configured to use the uplink control channel and an uplink data channel;
the receiver is configured to receive an uplink scheduling message based on the transmitted indication of uplink data; and
the transmitter is further configured to transmit uplink data on the uplink data channel based on the received uplink scheduling message, wherein the transmitted uplink data is included in a medium access control (MAC) protocol data unit (PDU), wherein the MAC PDU includes traffic volume information, wherein the traffic volume information includes a plurality of indications, wherein each indication of the plurality of indications identifies an amount of buffered data for at least one channel, wherein each channel of the at least one channel is associated with a priority, and wherein a header of the MAC PDU includes a field that indicates the presence of the traffic volume information.

2. The WTRU of claim 1 wherein the traffic volume information includes a plurality of amounts of data associated with a plurality of buffers.

3. The WTRU of claim 2 wherein each of the plurality of amounts of data is associated with a respective traffic flow or channel.

4. The WTRU of claim 1 wherein the receiver is further configured to receive an additional uplink scheduling message based on the transmitted traffic volume information.

5. A method implemented by a wireless transmit/receive unit (WTRU) comprising:
transmitting an indication of uplink data on an uplink control channel on a condition that uplink data is in a buffer of the WTRU; wherein the WTRU is configured to use the uplink control channel and an uplink data channel;
receiving, based on the transmitted indication of uplink data, an uplink scheduling message; and
transmitting, based on the received uplink scheduling message, uplink data on the uplink data channel, wherein the transmitted uplink data is included in a medium access control (MAC) protocol data unit (PDU), wherein the MAC PDU includes traffic volume information, wherein the traffic volume information includes a plurality of indications, wherein each indication of the plurality of indications identifies an amount of buffered data for at least one channel, wherein each channel of the at least one channel is associated with a priority, and wherein a header of the MAC PDU includes a field indicating the presence of the traffic volume information.

6. The method of claim 5 wherein the traffic volume information includes a plurality of amounts of data associated with a plurality of buffers.

7. The method of claim 6 wherein each of the plurality of amounts of data is associated with a respective traffic flow or channel.

8. The method of claim 5 further comprising receiving an additional uplink scheduling message based on the transmitted traffic volume information.

9. A Node-B comprising:
an antenna;
a receiver; and
a transmitter; wherein:
the receiver is configured to receive an indication of uplink data on an uplink control channel from a wireless transmit/receive unit (WTRU); wherein the Node-B is configured to use the uplink control channel and an uplink data channel;
the transmitter is configured to transmit an uplink scheduling message based on the received indication of uplink data; and
the receiver is further configured to receive uplink data on the uplink data channel based on the transmitted uplink scheduling message, wherein the received uplink data is included in a medium access control (MAC) protocol data unit (PDU), wherein the MAC PDU includes traffic volume information, wherein the traffic volume information includes a plurality of indications, wherein each indication of the plurality of indications identifies an amount of buffered data for at least one channel, wherein each channel of the at least one channel is associated with a priority, and wherein a header of the MAC PDU includes a field that indicates the presence of the traffic volume information.

10. The Node-B of claim 9 wherein the traffic volume information includes a plurality of amounts of data associated with a plurality of WTRU buffers.

11. The Node-B of claim 10 wherein each of the plurality of amounts of data is associated with a respective traffic flow or channel.

12. The Node-B of claim 9 wherein the transmitter is further configured to transmit, based on the received traffic volume information, an additional uplink scheduling message.

* * * * *